United States Patent [19]

Cleland

[11] Patent Number: 4,640,716

[45] Date of Patent: Feb. 3, 1987

[54] HIGH BULKING PIGMENT AND METHOD OF MAKING SAME

[75] Inventor: Andrew J. Cleland, Somerset, N.J.

[73] Assignee: Engelhard Corporation, Menlo Park, N.J.

[21] Appl. No.: 748,899

[22] Filed: Jun. 26, 1985

[51] Int. Cl.[4] .......................... C08L 89/00; C08J 3/00; C04B 14/00
[52] U.S. Cl. .................... 106/161; 106/137; 106/148; 106/214; 106/288 R; 106/299; 428/537.5; 428/511; 524/447
[58] Field of Search ............... 106/288, 299, 214, 137, 106/148, 161; 501/145–147; 428/537.5, 496, 511; 524/447

[56] References Cited

U.S. PATENT DOCUMENTS

| | | | |
|---|---|---|---|
| 2,964,403 | 12/1960 | Beekman et al. | 96/75 |
| 4,075,030 | 2/1978 | Bundy et al. | 106/288 |
| 4,076,548 | 2/1978 | Bundy et al. | 106/288 |
| 4,078,941 | 3/1978 | Bundy | 501/148 |
| 4,375,989 | 3/1983 | Makinen | 106/300 |
| 4,447,270 | 5/1984 | Howard et al. | 106/300 |
| 4,447,271 | 5/1984 | Howard et al. | 106/300 |

FOREIGN PATENT DOCUMENTS

| | | |
|---|---|---|
| 911500 | 10/1960 | United Kingdom . |
| 956748 | 9/1962 | United Kingdom . |
| 1024881 | 9/1962 | United Kingdom . |
| 1001997 | 7/1963 | United Kingdom . |
| 1373634 | 10/1971 | United Kingdom . |

OTHER PUBLICATIONS

"Ammonium Zirconium Carbonate, An Alternative Insolubilizer For Coating Binders", pp. 165–179.
TAPPI Proceedings of the 1982 Coating Conference.
W. M. Bundy et al, Chemically Induced Kaolin Floc Structures For Improved Paper Coating, TAPPI 1983 Coating Conference, pp. 175–187.
I. McAlpine, Zirconium Carbonate, An Alternative Insolubilizer For Coating Binders, TAPPI 1982 Coating Conference, pp. 165–179.

*Primary Examiner*—Theodore Morris
*Attorney, Agent, or Firm*—Inez L. Moselle

[57] ABSTRACT

A pigment comprising particles of uncalcined kaolin clay combined in the absence of a binder with an amount of an added source of zirconium ion, such as ammonium zirconium carbonate, at least sufficient to enhance optical character of a dried composition containing the pigment. In application, the pigment may be utilized in a coating for paper or other fibrous web substrate to produce sheet materials of enhanced opacity. Alternatively, the pigment may be employed as a filler in a fibrous web substrate to provide improved optical character of the material. Also disclosed is a method preparing a pigment, including preparing a dispersed slurry of clay particles in an aqueous medium, wherein the improvement comprises utilizing an uncalcined kaolin clay and introducing into the slurry in the absence of a binder the source of zirconium ion in an amount at least sufficient to enhance the optical character afforded by the pigment.

34 Claims, No Drawings

HIGH BULKING PIGMENT AND METHOD OF MAKING SAME

BACKGROUND OF THE INVENTION

1. Field Of The Invention

The present invention relates to kaolin clay pigments of a type employed to provide smooth, opaque surface finishes on fibrous web substrates such as high quality printing papers and the like. In particular, the present invention is concerned with such kaolin clay pigments and coatings for paper and other fibrous web substrates containing the same, which coatings have a high air voids content which contributes to good optical properties of the coated substrate.

2. Description Of The Related Art

Various pigments have been developed in the art which yield high void-containing coating structure. It is believed that such "high bulk" or high void content structures promote efficient light scatter, which is a property quantifiable as a scattering coefficient, and generally provides a measure of the opacifying power of the pigment. The advantage of high bulking clay pigments has been generally recognized by the prior art and various methods have been proposed for making such high bulking materials. By way of example, Bundy et al U.S. Pat. Nos. 4,075,030, 4,076,548 and 4,078,941 disclose that high bulk kaolinite may be obtained by selective flocculation, using an organic polyamine flocculant and an acid, of an ultrafine particle size kaolinite.

A general discussion of methods of preparing high-bulking clay pigments is set out in a paper by Bundy et al entitled "Chemically Induced Kaolin Floc Structures For Improved Paper Coating" at pages 175–187 of the proceedings of the 1983 Coating Conference of the Technical Association of the Pulp And Paper Industry (TAPPI).

The use of zirconium carbonates as insolubilizers for adhesives and binders used in paper coating applications is known in the art as indicated by U.K. Pat. No. 1,373,634, which is primarily concerned with the preparation of ammonium and potassium zirconium carbonates. The patent indicates that in addition to their use in aqueous dispersions of polymers, such as emulsion paints, the ammonium zirconium carbonate solutions are useful for insolubilizing the starch binders employed in paper coating processes.

U.K. Pat. No. 956,748 discloses that ammonium zirconyl carbonate may be employed to insolubilize a proteinaceous composition; example 2 of this patent discloses a clay coating slip including a proteinaceous adhesive and ammonium zirconyl carbonate.

U.K. Pat. No. 1,001,997 discloses the utilization of ammonium zirconyl carbonate to alter the permanency and water resistance of modified latex coating compositions such as copolymers which may contain inorganic pigments such as clay.

U.K. Pat. No. 1,024,881 discloses the use of ionic zirconium salts, more particularly ammonium zirconyl carbonate, to insolubilize starches employed as binders for coatings on paper and paperboard. In such system, the zirconium compound is added to a binder-containing composition to effect reaction of the zirconium compound with the binder material.

The use of ammonium zirconium carbonate in coating color compositions as an insolubilizer for binders is also disclosed in a publication entitled "Ammonium Zirconium Carbonate, An Alternative Insolubilizer For Coating Binders" at pages 165–179 of the TAPPI proceedings of the 1982 Coating Conference. At page 166 of this report, under the heading "Water Resistance Of Coated Paper," the preparation of coating colors by adding ammonium zirconium carbonate to a slip of clay, natural calcium carbonate and cooked starch or protein is disclosed. Under the heading "Experimental" beginning on page 174 of this paper, the preparation of various pigment slips and coating colors and the effect of ammonium zirconium carbonate on their rheology is described with viscosity test results being shown in FIGS. 9 and 10. Although the aforementioned tests include adding ammonium zirconium carbonate to clay slips in the absence of a binder, their purpose is to attempt to isolate the effect of ammonium zirconium carbonate on clays in the context of its potential use as an insolubilizer for binders or adhesives used in coating colors. For example, the abstract of this TAPPI paper states that the purpose of the paper is to consider ammonium zirconium carbonate as an insolubilizer for coating binders and is not suggestive of any other use of ammonium zirconium carbonate.

SUMMARY OF THE INVENTION

In accordance with the present invention there is provided a pigment comprising a zirconium-treated uncalcined kaolin clay made by combining the clay with an added source of zirconium ion under conditions including the absence of deleterious amounts of a binder, preferably in the absence of a binder, and the presence of at least a sufficient amount of the zirconium ion source to enhance the optical character of a substrate containing the dry pigment. The pigment may be in the form of an aqueous dispersion thereof which also contains a binder. Such binder may comprise one or more of latexes, starches, proteins, and mixtures of two or more thereof.

One aspect of the invention provides the pigment as comprising a dry coating on the substrate and another aspect provides the pigment dispersed as a dry filler in the matrix of a fibrous web comprising the substrate.

Another aspect of the invention provides that the added source of zirconium ion is a water-soluble zirconium salt, e.g., one or more of ammonium zirconium carbonate, ammonium zirconium sulfate and zirconium chloride, and the pigment is made by combining the clay and the zirconium salt in an aqueous medium. Ammonium zirconium carbonate is the preferred zirconium ion source.

The method aspect of the invention provides for preparing a clay pigment, the improvement comprising combining uncalcined kaolin clay particles with a source of zirconium ion, e.g., a water-soluble zirconium salt as described above combined in an aqueous medium with the clay, under conditions including the absence of deleterious amounts of a binder, e.g., in the absence of any binder, and the presence of at least a sufficient amount of the zirconium ion source to enhance the optical character of a substrate containing the pigment.

Although, as indicated hereinabove, ammonium zirconium carbonate has been proposed by the prior art as an insolubilizer for coating binders, the present invention is based on the unexpected and surprising fact that an uncalcined kaolin clay may be combined in the absence of a deleterious amount of any such binder, e.g., in the absence of any of such binder, with an amount of an added source of zirconium ion, such as ammonium zirconium carbonate, to enhance the optical character of a dried composition containing such pigment. As used herein, a "binder" has its conventional meaning as exemplified in the above-described prior art. Such binders have been found to be deleterious to obtaining the benefits of the present invention if present upon initial combining of the uncalcined kaolin clay on the zirconium ion source.

Other aspects of the invention are disclosed in the following description of preferred embodiments, including preferred zirconium ion source contents and preferred kaolin clay particle size distributions.

DETAILED DESCRIPTION OF THE PREFERRED EMBODIMENTS

Clay pigments such as kaolin clay pigments are conventionally utilized as components of aqueous "coating colors" comprising the clay pigment and a suitable binder or adhesive such as latex, starch, a proteinaceous material, or mixtures thereof. The high machine speeds of modern paper-coating equipment necessitate the use of coating colors having a high solids content so that in preparation of same an aqueous suspension of clay particles in water having a high solids content on the order of 60 to 70% solids (dry basis based on the total weight of dry clay solids plus water) is utilized. A strong deflocculating agent such as a sodium condensed phosphate salt must be present in such high solids clay suspensions in order to impart fluidity thereto, inasmuch as in the absence of such defloculant agents, the clay-water system would be substantially a solid mass.

The preparation of kaolin clay pigments for use in coating colors and the like is usually carried out in commercial practice by wet processing methods, which normally include a reducing bleach treatment applied to a flocculated acidic pulp of the clay which then if filtered and washed. The resulting washed filter cake may then be fluidized by the addition of a suitable dispersant, i.e., a deflocculating agent, to provide a so-called predispersed kaolin pigment. The thus-fluidized filter cake may be dried such as by spray drying to provide predispersed clay microspheres. Alternatively, the solids content of the fluidized filter cake to which a suitable deflocculating agent has been added, may be adjusted to a desired level by further addition of clay and dispersant to provide a deflocculated clay suspension or "slip" which may be utilized in preparing the coating color. In still other applications, and acid kaolin clay pigment is obtained by drying of the filter cake obtained by filtration of the acidic, flocculated clay pulp, without any addition of a dispersant. The resultant acidic pigments then may be deflocculated in water, as by addition of a condensed phosphate salt.

In any event, the resulting pigment product is a fluid, high solids content dispersion of kaolin clay particles in water obtained by utilization of a powerful deflocculating agent to maintain the requisite fluidity of the high solids clay suspension. For commerical use, the apparent viscosity of the initial high solids deflocculated suspension of the clay coating pigment must be sufficiently low to permit mixing and pumping of the clay suspension. In addition, the coating color obtained by addition of a suitable adhesive to the clay dispersion must have a viscosity suited for handling and application to the paper by the high speed coating equipment utilized in modern manufacturing processes. In general, it is desirable that the resulting dried coating on the paper should be as opaque as possible and it usually is desirable that the coating be very white, bright and smooth. Associated with these desirable characteristics, particularly of smoothness, brightness and opacity, are a high extent of fiber coverage by the coating color and good printability on the coated paper, i.e., the ability to accept printing inks without bleed-through or fuzziness.

As used herein with reference to dried compositions containing the pigment of the present invention, "optical character" means opacity and/or light-scattering coefficient of the dried composition. Light-scattering coefficients may readily be determined for pigments of the present invention in various dried compositions on "optically flat" black glass plates as described for example in "Performance Of Some Commercial Clays In Starch-Containing Paper-Coating Films, part 1, black glass plates as model substrates," A. Kaliski, *The Journal Of The Technical Association Of The Pulp And Paper Industry*, Volume 53, No. 11, November, 1970, pages 2077–2084, wherein is disclosed the finding that light-scattering coefficients measured at light wavelengths of 457 nanometers and 577 nanometers are useful indicators of the size distribution of light-scattering sites within coating films, and thus are useful indicators of the light-scattering ability of a given film. There is in general a correlation between increasing light-scattering coefficient and increased opacity of dried compositions containing pigments according to the present invention, however in some filler applications utilizing such pigments, wherein the clay utilized in the pigment contained a substantial amount, e.g., above 25% by weight, of "fines", i.e., particles of equivalent diameter below about 0.3 micron, increased light-scattering coefficient values were exhibited relative to otherwise comparable non-zirconium treated filler systems although the measured opacity values in the zirconium-treated filler systems did not exhibit a corresponding increase over the untreated fillers. Accordingly, the scope of the present invention is intended to encompass usages of zirconium ion in treating uncalcined kaolin clay pigments wherein the opacity and/or light-scattering coefficient for such system is increased relative to corresponding non-zirconium treated pigments.

As used herein "uncalcined kaolin clay" refers to a hydrous kaolin clay, such as a clay which is sufficiently hydrated to provide a significant degree of the desired bulking effect upon reaction with the added source of zirconium ion, preferably, a clay which has never been heated to a temperature in excess of about 300° F. (148.9° C.).

The kaolin clay employed for the pigment of the present invention is an uncalcined clay, which may be either delaminated or non-delaminated in form. The uncalcined kaolin clay is suitably rendered into particles for the pigment of the present invention by dispersing the clay with a strong dispersant, usually a condensed phosphate salt such as a sodium condensed phosphate. Suitable phosphate materials include tetrasodium pyrophosphate (TSPP) or sodium hexametaphosphate.

Suitably, the kaolin clay particles have a particle size distribution wherein the portion of particles with equivalent diameter below 0.3 micron does not exceed about 25% by weight of the total weight of particles present. This particle size criterion is desirable to ensure that there is not an excessive amount of clay particle "fines" present, which have been found in practice to necessitate the addition of high levels of the source of zirconium ion to the pigment to obtain the desired optical character enhancement effect, in excess of the amount of the zirconium ion material which is required for such purpose with clay particles not characterized by the presence of such fines. Preferably, the particles of uncalcined clay have a particle size distribution wherein the portion of particles with equivalent diameter below 0.3 micron does not exceed about 20% by weight of the total particles present. As used herein, the term "equivalent diameter" refers to the equivalent spherical sedimentation diameter in microns for the clay particles, as measured by Sedigraph using standard aqueous sedimentation techniques. As used hereinafter the phrase "the portion of particles with equivalent diameter" below or above a specific stated value refers to the weight percentage of particles of such characteristic, based on the total weight of particles of clay present.

In order to provide good flow and handling characteristics, with capability for uniform dispersion of clay particles in the pigment, it is suitable to have the portion of particles with equivalent diameter below about 2 microns being at least 50%, and preferably at least 75%.

As a balance of the foregoing considerations, it is particularly suitable if the particles of uncalcined clay have an average particle size of between about 0.5 and about 1 micron.

The source of zirconium ion useful in the broad practice of the present invention suitably may derive from a water-soluble zirconium salt, such as for example ammonium zirconium carbonate, ammonium zirconium sulfate, zirconium chloride, and mixtures thereof. Among the foregoing materials, ammonium zirconium carbonate is preferred.

While the amount of the zirconium ion source employed in the pigment of the present invention may be varied within wide limits depending on the amount of optical character enhancement desired and the specific zirconium ion source material employed, it is generally satisfactory to utilize from about 0.02% to about 2% by weight, as $ZrO_2$, of such zirconium ion source, based on the weight of kaolin clay (dry basis) particles in the pigment. Preferably, the added source of zirconium ion comprises, as $ZrO_2$, from about 0.1% to about 1.2%, more preferably from about 0.2% to about 0.8% by weight of kaolin clay particles (dry basis) in the pigment. For example, on the foregoing basis, from about 0.1% to about 10%, preferably from about 0.5% to about 6%, more preferably from about 1% to about 4% by weight of ammonium zirconium carbonate is preferred.

The pigment according to the present invention may be formulated into a variety of intermediate or end use products.

For example, the pigment may be formulated by "wet-processing", wherein a dispersed slurry of uncalcined kaolin clay particles in an aqueous medium is prepared, using a dispersant such as a sodium condensed phosphate, e.g., TSPP or sodium hexametaphosphate. The source of zirconium ion is introduced into such aqueous slurry in an amount at least sufficient to impart optical character enhanceability to the pigment in the desired end use application. The resultant zirconium ion source-treated aqueous slurry then may be processed in conventional fashion, as by acidifying the slurry with an acid, e.g., sulfuric acid, to flocculate the clay solids, followed by bleaching of the clay solids, and filtration of the flocced clay slurry to yield an acid filter cake.

The acid filter cake then may be processed to form various intermediate or end use pigment products. For example, the filter cake may be treated with a suitable clay dispersant, such as the sodium condensed phosphate materials discussed hereinabove, followed by spray drying of an aqueous solution of the dispersant treated filter cake, to form predispersed kaolin pigment microspheres. Such pigment microspheres then are suitably employed for make-down of deflocculated clay suspensions, by simple addition of the microspheres into water or aqueous medium for final application of the pigment to the end use article.

Alternatively, the filter cake may be washed and fluidized to form an aqueous slurry, to which further clay and dispersant may be added to deflocculate the clay and provide a deflocculated clay suspension of a predetermined desired solids content. Such deflocculated clay suspensions or "slips" may be shipped in that form for final use.

Apart from the above methods, the filter cake may be washed and then dried to obtain an acidic kaolin clay pigment. The dried pigment then may be pulverized and the pulverized filter cake material processed for make-down with water and dispersant addition to form a deflocculated slurry of clay solids.

As used herein, the phrase "fluidizing in aqueous medium" when used in application to kaolin clay or filter cake material refers to the addition to the clay solids of water or other aqueous medium to provide a dispersion of clay solids in the water/aqueous medium. Regardless of the specific treatment to which the filter cake solids are subjected, the final end use composition for the kaolin clay pigment is an aqueous slurry of the dispersed clay solids, wherein dispersion has been achieved by treatment or addition to the clay solids or medium containing the clay solids, of a clay dispersant, such as the aforementioned sodium condensed phosphate materials.

The aqueous slurry of deflocculated, zirconium source-containing clay solids according to the invention then may be used to form a "coating color" by addition to the clay pigment slurry of a suitable binder or adhesive, as for example latex, starch, protein, or mixtures thereof. It is a critical feature of the present invention that such coating colors are formed by addition of binder only after the uncalcined kaolin clay has been combined with the added source of zirconium ion, in the absence of a binder. The reason for this is that if a binder is present with the uncalcined kaolin clay prior to addition of the zirconium ion source, the zirconium ion source tends to react with the binder, as in the prior art systems described hereinabove wherein zirconium ion source compounds were employed for insolubilization of the binder material, by reaction therewith. Thus, the pigment of the present invention must be formed from particles of uncalcined kaolin clay combined in the absence of a binder with the source of zirconium ion, and after such combination has been effected, it is suitable to add to the pigment composition a suitable binder to form the coating color. It is within the broad purview of the present invention in such case to thereafter add a further amount of the zirconium ion source material, such as ammonium zirconium carbonate, to insolubilize the binder, after the uncalcined kaolin clay particles have been initially combined with an initial amount of the zirconium ion source material, in a concentration at least sufficient to enhance the optical character of the dried composition containing the pigment.

In use, the pigment of the present invention may be used as a coating for a fibrous web or other material, such as a paper substrate, on which the coating is applied and subsequently dried to form a dried coating of enhanced optical character, and good ink printability. Such fibrous web suitably may comprise a non-woven mat of cellulosic fibers, such as paper. Thus, it is possible by means of the pigment of the present invention to form sheet paper coated on at least one side thereof with a dried coating containing a pigment according to the invention, which is characterized by significantly higher opacity than achieved by the use of kaolin clay pigments not treated with the zirconium ion source in accordance with the present invention. Alternatively, the pigment of the present invention may be employed as a filler for a fibrous web, such as a non-woven matrix of fibers, such as cellulosic fibers in the case of paper materials.

The present invention is more fully shown and described with reference to the following non-limiting examples, wherein all parts and percentages are by weight, unless otherwise expressly stated.

EXAMPLE 1

An uncalcined kaolin clay having 88% of its particles less than 2 microns equivalent diameter, an average particle diameter of 0.70 micron, and with 15.5% of its particles less than 0.3 micron equivalent diameter (as measured with a Sedigraph 5000) is dispersed with TSPP in a Waring Blendor ® at 70% solids concentration. This slurry is then diluted with water to about 20% solids and stirred slowly to prevent settling of the clay particles. To this slurry is added a solution of ammonium zirconium carbonate (commercially available from Magnesium Elektron Inc., Flemington, N.J.), wherein the ammonium zirconium carbonate had a slurry concentration of 2%, based on the weight of dry clay solids. This addition of ammonium zirconium carbonate caused the pH of the slurry to increase from 6.8 to 8.5, with no visible change in the slurry mixture.

After five minutes stirring, the slurry mixture was acidified to a pH of 2.8, using a 10% sulfuric acid solution. The slurry may at this point be bleached with a commercially available bleaching agent, such as sodium hydrosulfite at a rate of 10 lb/T in which case the slurry pH is maintained at a level of about 2.8–3.0 for approximately 15 minutes. Stirring of the slurry after acid addition then was discontinued and the mixture was allowed to stand undisturbed for 30 minutes. The flocced pigment then was filtered, washed and dried at 180° F. (82.2° C.) in a forced air oven. (As indicated hereinabove, the pigment may at this point be pulverized prior to use.)

The ammonium zirconium carbonate-treated clay then was dispersed in conventional manner with TSPP. At 63% solids, a well-dispersed fluid slurry was obtained, with the mixture at higher solids levels being more viscous and more difficult to disperse. This was quite unlike the starting clay material, which was easily dispersed at 70% solids.

EXAMPLE 2

Two samples of dispersed clay aqueous slurries were made in accordance with the procedure of Example 1, except that one (Sample 1) was not treated with ammonium zirconium carbonate, while the other (Sample 2) was treated with ammonium carbonate as described in Example 1. Both samples were bleached with sodium hydrosulfite at a concentration of 10 lbs/ton, prior to filtration of the flocculated pigment-containing slurry.

The optical properties of the respective Samples 1 and 2 then were evaluated by measurement of light-scattering coefficients at wavelengths of 457 and 577 nanometers, on black glass plates in accordance with the procedure discussed in "Performance Of Some Commercial Clays In Starch-containing Paper-coating Films, part 1, black glass plates as model substrates," A. Kaliski, *The Journal Of The Technical Association Of The Pulp And Paper Industry*, volume 53, No. 11, November 1970, pages 2077–2084. The glossing ability of these samples was also measured as 75° gloss, using the procedure of TAPPI Standard T480 ts-65. The scattering coefficient is identified in Table I as S(x), wherein x is the wavelength of the incident light in nanometers.

TABLE 1

| Sample | (a) | (b) | (c) | (d) | (e) |
|---|---|---|---|---|---|
| 1 | 0 | 70 | 0.114 | 0.080 | 78.6 |
| 2 | 2 | 63 | 0.187 | 0.135 | 59.6 |

(a) = Ammonium zirconium carbonate concentration %
(b) = Make-Down Solids %
(c) = S(457), m²/gm
(d) = S(577), m²/gm
(e) = 75° Gloss, %

As seen from the foregoing data of Table I, the incorporation in the aqueous uncalcined clay slurry of ammonium zirconium carbonate for combination with the dispersed clay solids therein resulted in a substantial increase in scattering coefficient S. For example, at 457 nanometers, the measured light-scattering coefficient was 64% higher for Sample 2 containing ammonium zirconium carbonate as a pigment component, as compared to Sample 1 containing no ammonium zirconium carbonate. At 577 nanometers, the difference in light-scattering coefficient is even more pronounced, with Sample 2 showing a 69% increase in coefficient value over Sample 1. The substantial improvement in light-scattering coefficient was achieved at some reduction in 75° gloss, by about 24%. The Table 1 data show that the presence of ammonium zirconium carbonate in the pigment composition effects a substantial improvement in the opacifying power of the pigment as reflected in the marked increase in the value of the scattering coefficient.

EXAMPLE 3

Samples 3–9 were prepared in accordance with the procedure of Example 1, but at varying levels of ammonium zirconium addition. Values for the light-scattering coefficient S were determined at 457 and 577 nanometers, together with 75° gloss, in the same manner as in Example 2. The results for these samples are set forth in Table 2 below.

TABLE 2

| Sample No. | (a) | (b) | (c) | (d) | (e) |
|---|---|---|---|---|---|
| 3 | 63 | 0.25 | 0.126 | 0.089 | 78.3 |
| 4 | 63 | 0.50 | 0.128 | 0.092 | 78.4 |
| 5 | 63 | 1.0 | 0.134 | 0.094 | 78.3 |
| 6 | 63 | 2.0 | 0.166 | 0.121 | 68.7 |
| 7* | 62 | 3.0 | 0.199 | 0.144 | 52.1 |
| 8* | 45 | 4.5 | 0.243 | 0.169 | 36.4 |
| 9* | 49 | 6.0 | 0.261 | 0.184 | 21.1 |

(a) = make down solids
(b) = Ammonium zirconium carbonate concentration, %
(c) = S(457), m²/gm
(d) = S(577), m²/gm
(e) = 75° Gloss, %
*drawn down at 45% solids As shown by the data in Table 2, low levels of ammonium zirconium carbonate up to 1% have only a slight effect on the opacifying power of the clay, as reflected by the scattering coefficient S, with gloss being substantially constant in this range of samples (Samples 3-5), whereas higher concentrations of such zirconium ion source produce significant increases in scattering coefficients, particularly at concentration values of 3% and above (Samples 7-9) where scattering coefficient values in excess of 0.20 m$^2$/gm are observed at 457 nanometers. It is to be observed that scattering coefficients of 0.25 m$^2$/gm, as measured at 457 nanometers, are rare for hydrous clays and are similar to those of calcined clays made-down at 50% solids concentrations and above.

Although high levels of ammonium zirconium carbonate substantially increase the measured scattering coefficients and opacity of the pigment, the gloss of the resultant coating is correspondingly decreased, together with reduction in the dispersability of the pigment composition. The decline in dispersability of the pigment composition with increasing concentrations of the zirconium salt means that at the higher levels of salt concentration, the solids level in the clay dispersion must be correspondingly reduced; as a result, Samples 7-9 were drawn down at 45% solids. Thus, in the case of Sample 9, for example, the 6% concentration of ammonium zirconium carbonate rendered the pigment composition difficult to disperse above 50% solids in the pigment, and while such reduction in dispersability may be disadvantageous in certain applications, it is compensated for by the superior scattering power (opacity) that is obtained. At lower ammonium zirconium carbonate concentration levels, the pigment may suitably be utilized in an aqueous dispersion containing at least 50% by weight clay solids, such as may readily be processed and handled for application purposes.

EXAMPLE 1

Samples 10-26 were prepared to demonstrate the use of ammonium zirconium carbonate with clay in a paper filler application using clays containing relatively high levels of "fines". All samples were made by the procedure of first dispersing the uncalcined clay in aqueous medium and diluting same as required to produce a 20% solids slurry, followed (except in the case of Sample 10, which contain no filler and serve as a blank control) by addition of a 6% aqueous solution of ammonium zirconium carbonate as commercially available from Magnesium Elektron, Inc. (Flemington, N.J.), to yield an aqueous pigment dispersion containing 1.2% ZrO$_2$, based on the weight of dry clay solids in the dispersion; finally, the clay dispersion was acidified to a pH in the range from about 2.8 to about 3.0. Samples 11-14 utilized as the uncalcined clay component thereof a clay commercially available from Engelhard Corporation under the trade name KWW. Samples 15-18 utilized the KWW clay modified with ammonium zirconium carbonate in accordance with the present invention. Samples 19-22 utilized as the uncalcined clay a clay commercially available from Engelhard Corporation as Ultra Cote ®. Samples 23-26 utilized the Ultra Cote ® clay modified by ammonium zirconium carbonate in accordance with the present invention. Both of these KWW and Ultra Cote ® clays were materials containing a high concentration of fines; the Ultra Cote ® material, for example, had an average particle equivalent diameter of 0.63 micron, with a particle size distribution comprising 83% of the particles having an equivalent diameter below 2 microns, 43% below 0.5 micron, and in excess of 25% below 0.3 micron.

The pulp blend utilized to form the paper for these tests was a blend of 50% by weight Astracel bleached hardwood kraft, and 50% by weight Albacel bleached softwood kraft. The pulp blend was refined at a 2% consistency to an end-point of 550 Canadian standard freeness in a Valley beater.

Samples were prepared by adding pigment to the pulp blend in a British disintegator at levels calculated to produce mineral content levels of approximately 3, 6, 9 and 12%. These pulp/pigment blends were diluted to 0.25% fiber consistency and were stored in separate stock chests, where 2% alum was added (based on dry fiber weight) and the stock pH was adjusted to 4.8 with soda ash. Hand sheets were formed on an M/K miniformer at 80 grams/sq. meter basis weight. Hydraid 778, an amphoteric retention aid, was added to the stock in the head box at a rate of 0.5 lbs/ton of fiber. The hand sheets were pressed and dried on the miniformer, then conditioned at least 24 hours at 73° F. (22.8° C.) and 50% relative humidity.

Five sheets from each pigment concentration level were selected and tested for G. E. Brightness (TAPPI Standard T452-M-58) and B & L opacity (TAPPI Standard T425-M-60). After being tested, the sheets were supercalendered 2 nips at 500 psi and 73° F., (22.8° C.) 50% relative humidity (room temperature). The sheets were allowed to recondition overnight in the 73° F. (22.8° C.), 50% relative humidity environment before G. E. Brightness and B & L opacity were re-measured. The bursting strength (Mullen) of the supercalendered sheets was also measured. The sheets then were ashed at 1800° F. (982.2° C.) in order to determine their net mineral (pigment) content levels.

The results are set forth in Table 3 below.

TABLE 3

| Sample No. | Calendered | | | |
|---|---|---|---|---|
| | G.E. Brightness | B & L Opacity | Scattering Coefficient | Bursting Strength* |
| 10 | 83.2 | 79.1 | .0291 | 37.7 |
| 11 | 81.0 | 80.1 | .0377 | 32.5 |
| 12 | 81.5 | 82.3 | .0797 | 27.0 |
| 13 | 81.9 | 83.7 | .0920 | 21.2 |
| 14 | 81.4 | 84.9 | .0935 | 18.0 |
| 15 | 82.9 | 80.7 | .0885 | 32.7 |
| 16 | 82.6 | 82.8 | .1064 | 26.5 |
| 17 | 82.5 | 84.2 | .0960 | 21.7 |
| 18 | 80.2 | 86.3 | .0928 | 14.8 |
| 19 | 82.9 | 80.2 | .0627 | 27.9 |
| 20 | 78.3 | 83.4 | .0790 | 22.5 |
| 21 | 83.6 | 83.5 | .1027 | 16.0 |
| 22 | 85.4 | 83.7 | .1087 | 14.6 |
| 23 | 84.5 | 79.6 | .0751 | 29.9 |
| 24 | 85.1 | 81.2 | .1032 | 23.6 |
| 25 | 85.3 | 83.6 | .1219 | 17.1 |
| 26 | 85.7 | 84.7 | .1209 | 13.3 |

*psi

The opacity values set forth in Table 3 are adjusted in that the values are calculated from the basis weight of 80 gm per sq. meter and are thus normalized in terms of the weight of the sheet per unit area which is filled. The scattering coefficient was the value at a wavelength of 457 nanometers.

The data in Table 3 show that the normalized opacity values for the ammonium zirconium carbonate-modified clay fillers were of commensurate value with the unmodified clay fillers, both being somewhat higher than the blank control (Sample 10). Contrarywise, the scattering coefficient for the ammonium zirconium carbonate modified clay pigments was substantially increased over the clay fillers which were not modified with the zirconium salt. The combination of the zirconium ion source in the hydrous clay filler materials thus resulted in all cases in a substantial improvement in the scattering coefficient characteristic. The bursting strength of the zirconium salt modified clay fillers was substantially the same as the unmodified clay fillers.

As indicated hereinabove, increases in scattering coefficient in coating systems are generally associated with corresponding increases in the measured value of opacity of the coating or coated substrate. In filler systems the fibrous web or other porous substrate is utilized to form a matrix in which the pigment is a more or less continuous phase. In filler systems the values measured for opacity are particularly sensitive to the particle size distribution of the pigment employed in the filler, and this may be the reason for the observed lack of increase in opacity despite a higher scattering coefficient in the ammonium zirconium carbonate-treated filler.

In any event, in both coating and filler systems, the presence of an excessive amount of "fines" in the particle size distribution of the uncalcined kaolin clay will necessitate the addition of correspondingly higher levels of the zirconium ion source to achieve the requisite desired improvement in optical characteristics.

The foregoing may be applied to the data in Table 3, in that both the KWW and the Ultra Cote ® clays were materials with a high level of fines, viz., an amount above 25% by weight of particles of equivalent diameter below 0.3 micron. In general, it may be stated that the particle size distribution of the uncalcined kaolin clay starting material will govern the amount of zirconium ion source material required to obtain a specific performance characteristic. Thus, a finer clay will give a higher gloss than a coarser clay, but will also require higher zirconium ion source levels to attain a desired scattering coefficient. Depending on the specific requirements of a given end use, the pore size distribution of the clay material and the concentration of the zirconium ion source material may be readily optimized without undue experimentation so as to maximize the cost effectiveness of the zirconium compound-modified kaolin clay pigment.

EXAMPLE 5

Samples 27-29 were prepared in accordance with the procedure of Example 1, at varying make down solids levels, to assess the effect of work input (mixing energy expenditure) on the optical properties of the resulting coatings. The specific make down solids levels and the corresponding optical properties are set forth in Table 4 below. The slurry in each instance was mixed for 1 minute, the slurries at higher solids levels being increasingly more viscous and difficult to disperse.

TABLE 4

| Sample No. | (a) | (b) | (c) | (d) |
|---|---|---|---|---|
| 27 | 63 | 0.166 | 0.121 | 67.8 |
| 28 | 65 | 0.149 | 0.116 | 63.6 |
| 29 | 67 | 0.142 | 0.114 | 63.4 |

(a) = make-down solids, % by wt.
(b) = S(457), m²/gm
(c) = S(577), m²/gm
(d) = 75° Gloss, %

As shown in the above Table, the ammonium zirconium carbonate-treated pigments lost some of their scattering power at high make-down solids levels, as reflected by lower scattering coefficient values, but even at the highest value of make-down solids (sample 29), the scattering coefficient values were still within 15% of the values for as the lowest make-down solids sample (Sample 27).

EXAMPLE 6

In this test, the printability of paper substrates coated with a pigment according to the present invention was evaluated. Sample 30 was a pigment according to the present invention, prepared generally in accordance with the procedure of Example 1. Sample 31 was prepared correspondingly, but without ammonium zirconium carbonate treatment of the clay slurry. Sample 32 was a commercially available clay pigment, Litecote ® (Engelhard Corporation). Sample 33 was a blend of 90% Litecote ® and 10% of another commercially available clay pigment, Ansilex ® (Englehard Corporation).

The printability of paper substrates coated with the pigments of Samples 30-33 were determined by the recently proposed (tentative standard) Heliotest, as described in "Method for Determination of Rotogravure Printability with the Heliotest Tester", February, 1981. No. NFQ 61-002 (AFNOR). The Heliotest data for papers coated with the various pigment samples are set out below in Table 5.

TABLE 5

| Sample No. | Coating Weight, lb./3 msf | Heliotest, mm.* |
|---|---|---|
| 30 | 3.25 | 68.5 |
| 30 | 4.0 | 74.5 |
| 30 | 4.75 | 76 |
| 31 | 3.25 | 68 |
| 31 | 4.0 | 77 |
| 31 | 4.75 | 82 |
| 32 | 3.25 | 43.5 |
| 32 | 4.0 | 51.5 |
| 32 | 4.75 | 55 |
| 33 | 3.25 | 61 |
| 33 | 4.0 | 70 |
| 33 | 4.75 | 80 |

*mm. 20th missing dot, 0.8 m/s 60 kgf, counter weight at minimum

As shown by the above-tabulated data, the ammonium zirconium carbonate-treated clay pigment of the present invention (Sample 30) provided paper coatings characterized by good printability as evidenced by the high Heliotest value, in comparison to the commercially available clay pigments of Samples 32-33, and generally consistent with the printability performance of the unmodified control pigment (Sample 31).

EXAMPLE 7

The procedure of Example 1 was repeated but with a clay material having a substantial portion of fines therein, and with varying concentrations of ammonium zirconium carbonate in the respective samples. The particle size distribution of this clay comprised 88% of its particles less than 2 microns equivalent diameter, an average particle equivalent diameter of 0.51 micron, and 27% of its particles less than 0.3 micron equivalent diameter. Sample 34 contained 1% ammonium zirconium carbonate, Sample 35, 2%, and Sample 36, 3%. The optical properties of the coatings prepared from such samples were as evaluated in accordance with the procedures set forth in Example 2, with the results tabulated in Table 6 below.

TABLE 6

| Sample | (a) | (b) | (c) | (d) |
|--------|-----|-------|-------|------|
| 34 | 63 | 0.089 | 0.057 | 79.9 |
| 35 | 63 | 0.091 | 0.060 | 79.2 |
| 36 | 63 | 0.113 | 0.076 | 73.7 |

(a) = make-down solids, % by wt.
(b) = S(457), m$^2$/gm
(c) = S(577), m$^2$/gm
(d) = 75° Gloss, %

Due to the relatively finer particle distribution of the clay material, the coatings shown in Table VI had lower scattering coefficients than the coatings shown in Table 1 derived from a coarser particle distribution clay. Consistent with this trend, the finer clay sample yielded a significantly higher gloss than the coarser clay material (compare Sample 35 to Sample 2). This decrease in scattering coefficient with increasing content of fines in the clay pigment means that with the latter, a greater amount of ammonium zirconium carbonate is required to achieve the same optical enhancement character. As previously indicated, it is preferred in the general practice of the invention to utilize clay materials containing a low content of fines, viz. wherein the portion of the particles with equivalent diameter below 0.3 micron does not exceed about 25% by weight of the total clay particles present.

Zirconium ion source-treated kaolin clays according to the invention afford various advantages over other types of bulking pigments. The preparative process requires no special operations such as calcination of the clay and the zirconium compounds, such as ammonium zirconium carbonate, are not flammable, corrosive or toxic. Further, many bulking pigments, such as calcined clay and some aggregated pigments, exhibit shear blockage (extreme dilatancy) at moderate rates of shear. This can lead to problems when making-down, pumping or screening slurries made from these pigments. The zirconium ion source-treated pigments according to the present invention do not show this shear blockage, although they are more viscous and dilatant than their precursor (unmodified) clay materials. The pigments according to the present invention are not overly shear sensitive, that is, they do not lose much of their opacifying power when made-down at high solids levels. For optimal light scattering properties, however, the pigments according to the present invention should be made-down at a solids level that gives a fluid dispersion free of clay aggregates. This level will differ for each pigment application, depending on the size distribution and the specific zirconium ion source concentration employed, but as indicated may be readily determined by the artisan, without undue experimentation.

While the invention has been described in detail with reference to specific preferred embodiments, it will be appreciated that numerous variations of such embodiments are possible which variations lie within the broad scope of the present invention.

What is claimed is:

1. A pigment comprising a zirconium-treated uncalcined kaolin clay made by combining the clay with an added source of zirconium ion under conditions including the absence of deleterious amounts of a binder and the presence of at least a sufficient amount of the zirconium ion source to enhance the optical character of a substrate containing the dry pigment.

2. The pigment of claim 1 made in the absence of a binder.

3. The pigment of claim 1 comprising a dry coating on the substrate.

4. The pigment of claim 1 dispersed as a dry filler in the matrix of a fibrous web comprising the substrate.

5. The pigment of claim 1 wherein the added source of zirconium ion is a water-soluble zirconium salt and the pigment is made by combining the clay and the zirconium salt in an aqueous medium.

6. The pigment of claim 1 wherein the added source of zirconium ion is selected from the group consisting of one or more of ammonium zirconium carbonate, ammonium zirconium sulfate and zirconium chloride.

7. The pigment of claim 1 wherein the added source of zirconium ion is ammonium zirconium carbonate.

8. The pigment of claim 1 wherein the added source of zirconium ion comprises, as $ZrO_2$, from about 0.02% to about 2% by weight of the weight (dry basis) of the kaolin clay particles in the pigment.

9. The pigment of claim 1 wherein the added source of zirconium ion comprises, as $ZrO_2$, from about 0.1% to about 1.2% by weight of the weight (dry basis) of the kaolin clay particles in the pigment.

10. The pigment of claim 1 wherein the added source of zirconium ion comprises, as $ZrO_2$, from about 0.2% to about 0.8% by weight of the weight (dry basis) of the kaolin clay particles in the pigment.

11. The pigment of claim 1 wherein the koalin clay is in the form of particles having a particle size distribution such that not more than about 25% by weight of the total weight of the kaolin clay comprises particles of equivalent diameter of less than about 0.3 micron.

12. The pigment of claim 11 wherein not more than about 20% by weight of the total weight of the kaolin clay comprises particles of equivalent diameter of less than about 0.3 micron.

13. The pigment of claim 12 wherein at least 50% by weight of the total weight of the kaolin clay comprises particles of equivalent diameter of less than about 2 microns.

14. The pigment of claim 13 wherein at least 75% by weight of the total weight of the kaolin clay comprises particles of equivalent diameter of less than about 2 microns.

15. The pigment of claim 11 wherein the particles of uncalcined clay have an average particle size of between about 0.5 and 1 micron.

16. A pigment composition comprising an aqueous dispersion of (i) a pigment comprising particles of zirconium-treated uncalcined kaolin clay obtained by combining the kaolin clay with an added source of zirconium ion under conditions including the absence of deleterious amounts of a binder and the presence of at least a sufficient amount of the zirconium ion source to enhance the optical character of a substrate containing the dry pigment, and (ii) a binder.

17. The pigment composition of claim 1 made in the absence of a binder.

18. The pigment composition of claim 16 wherein said binder is selected from the group consisting of one or more of latexes, starches, proteins and mixtures of two or more thereof.

19. A paper substrate coated on at least one side thereof with a coating comprising the pigment of claim 1.

20. A material comprising a non-woven matrix of fibers having the pigment of claim 1 dispersed therein.

21. The material of claim 20 wherein said matrix fibers comprise cellulosic fibers.

22. In a method of preparing a clay pigment, the improvement comprising combining uncalcined kaolin clay particles with a source of zirconium ion under conditions including the absence of deleterious amounts of a binder and the presence of at least a sufficient amount of the zirconium ion source to enhance the optical character of a substrate containing the pigment.

23. The method of claim 22 wherein the source of zirconium ion is a water-soluble zirconium salt and the uncalcined kaolin clay and said source are combined in an aqueous medium.

24. The method of claim 23 wherein said source of zirconium ion is selected from the group consisting of ammonium zirconium carbonate, ammonium zirconium sulfate, zirconium chloride and mixtures thereof.

25. The method of claim 23 wherein said source of zirconium ion is ammonium zirconium carbonate.

26. The method of claim 22 wherein said source of zirconium ion comprises, as $ZrO_2$, from about 0.02% to about 2% by weight of the weight (dry basis) of the kaolin clay in the pigment.

27. The method of claim 22 wherein said source of zirconium ion comprises, as $ZrO_2$, from about 0.1% to about 1.2% by weight of the weight (dry basis) of the kaolin clay in the pigment.

28. The method of claim 22 wherein said source of zirconium ion comprises, as $ZrO_2$, from about 0.2% to about 0.8% by weight of the weight (dry basis) of the kaolin clay in the pigment.

29. The method of claim 22 wherein the kaolin clay is in the form of particles having a particle size distribution such that not more than about 25% by weight of the total weight of the kaolin clay comprises particles of equivalent diamter of less than about 0.3 micron.

30. The method of claim 22 wherein at least 50% by weight of the total weight of the kaolin clay comprises particles of equivalent diameter of less than about 2 microns.

31. The method of claim 22 wherein at least 75% by weight of the total weight of the kaolin clay comprises particles of equivalent diameter of less than about 2 microns.

32. The method of claim 29 wherein the clay particles have an average particle size of between about 0.5 and 1 micron.

33. The pigment of claim 1 including a binder added after combining the clay with the added source of zirconium ion, to enhance the optional character of the substrate containing the dry pigment.

34. The method of claim 22 including the further step of adding a binder after the step of combining the clay particles with the source of zirconium ion, to enhance the optical character of the substrate containing the dry pigment.

* * * * *